(12) United States Patent
Hoé

(10) Patent No.: US 12,479,226 B1
(45) Date of Patent: Nov. 25, 2025

(54) METHOD OF PRINTING ON WORKPIECES AND A WORKPIECE PRINTING SYSTEM

(71) Applicant: LEGO A/S, Billund (DK)

(72) Inventor: Mikkel Schildknecht Hoé, Billund (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 18/871,957

(22) PCT Filed: Jun. 8, 2023

(86) PCT No.: PCT/EP2023/065348
§ 371 (c)(1),
(2) Date: Dec. 5, 2024

(87) PCT Pub. No.: WO2023/237659
PCT Pub. Date: Dec. 14, 2023

(30) Foreign Application Priority Data

Jun. 8, 2022 (DK) .................................. 202270300

(51) Int. Cl.
*B41F 33/00* (2006.01)
*B25J 11/00* (2006.01)
(Continued)

(52) U.S. Cl.
CPC ............ *B41M 1/40* (2013.01); *B25J 11/0075* (2013.01); *B25J 15/0019* (2013.01);
(Continued)

(58) Field of Classification Search
CPC ...... B41F 17/001; B41F 17/006; B41F 17/08; B41F 7/10; B41F 17/18; B41F 17/22;
(Continued)

(56) References Cited

U.S. PATENT DOCUMENTS

| 4,745,857 A | 5/1988 | Putnam et al. |
| 2014/0234500 A1 | 8/2014 | Mitchell et al. |
| 2017/0182820 A1 | 6/2017 | Nakano et al. |

FOREIGN PATENT DOCUMENTS

| EP | 3964361 A1 | 3/2022 |
| GB | 2551834 A1 | 1/2018 |
| JP | 2017071173 A2 | 4/2017 |

OTHER PUBLICATIONS

International Search Report and Written Opinion corresponding to Application No. PCT/EP2023/065348, dated Sep. 12, 2023, 10 pages.
(Continued)

*Primary Examiner* — Christopher E Mahoney
*Assistant Examiner* — Marissa Ferguson-Samreth
(74) *Attorney, Agent, or Firm* — Day Pitney LLP; George Chaclas; Anthony A. Kassas

(57) ABSTRACT

A method of printing on workpieces comprising placing a workpiece in one of a plurality of holders provided spaced apart on a conveyer and moving the holders forward. The method comprises obtaining a first image of the workpiece in the holder, the first printing station comprising a printing head adjustable relative to the conveyer, and determining, based on the first image, the actual position of the workpiece in the holder. Further, the method comprises calculating a printing position of the printing head relative to the holder for positioning the print in a predetermined desired position on the workpiece, based on the predetermined desired position of the print on the workpiece and the determined actual position of the workpiece in the holder. The method also comprises adjusting the position of the printing head to the calculated printing position and printing a print on the workpiece.

13 Claims, 1 Drawing Sheet

(51) Int. Cl.
*B25J 15/00* (2006.01)
*B41F 17/00* (2006.01)
*B41M 1/40* (2006.01)
*G06T 7/70* (2017.01)

(52) U.S. Cl.
CPC .......... *B41F 17/001* (2013.01); *B41F 17/006* (2013.01); *B41F 33/0009* (2013.01); *B41F 33/0036* (2013.01); *G06T 7/70* (2017.01); *G06T 2207/30164* (2013.01)

(58) Field of Classification Search
CPC ........ B41F 17/24; B41M 1/40; B25J 11/0075; B25J 15/0019; G06T 7/07; G06T 2207/30164
See application file for complete search history.

(56) References Cited

OTHER PUBLICATIONS

DK First Technical Examination corresponding to Application No. PA202270300, dated Dec. 9, 2022, 7 pages.

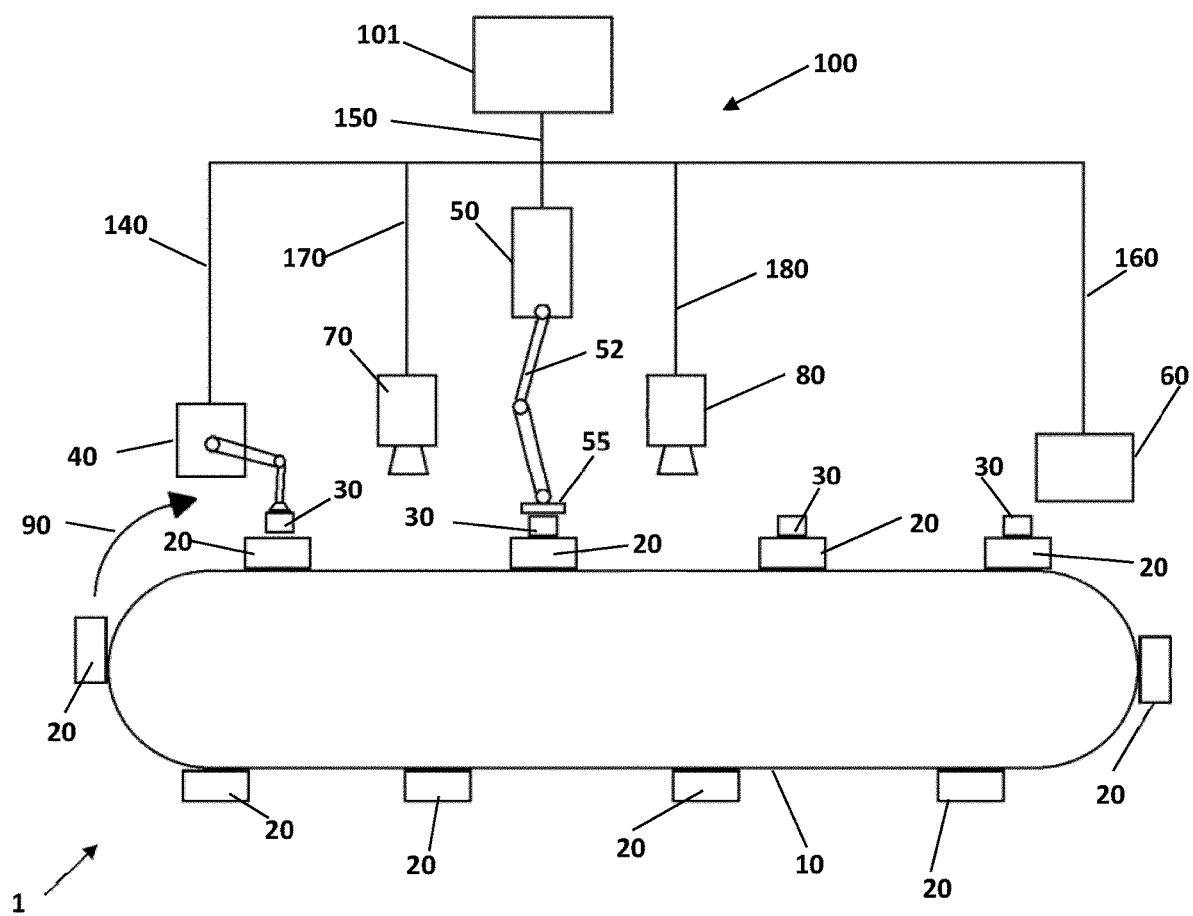

METHOD OF PRINTING ON WORKPIECES AND A WORKPIECE PRINTING SYSTEM

CROSS-REFERENCE TO RELATED APPLICATIONS

The present application is a U.S. National Stage Application of International Application No. PCT/EP2023/065348 filed on Jun. 8, 2023, published on Dec. 14, 2023 as WO2023/237659, and entitled A METHOD OF PRINTING ON WORKPIECES AND A WORKPIECE PRINTING SYSTEM, which claims the benefit and priority of Danish Patent Application No. PA202270300, filed on Jun. 8, 2022, each of which is incorporated herein by reference in its entirety for any purpose whatsoever.

FIELD OF THE DISCLOSURE

The present disclosure relates to a method of printing on workpieces and a workpiece treatment system for printing on workpieces.

BACKGROUND

After forming a workpiece, such as an injection moulded workpiece formed in plastic, in some cases it is desirable to provide a print on the workpiece to change the appearance of the workpiece according to the intended use of the workpiece. For example, the workpiece may be the head of a toy figurine, which is to be assembled to other workpieces to form the toy figurine. Such a workpiece may be made, e.g. in an injection moulding process, with certain features of a head, ears and/or nose for example, formed as integrated parts of the workpiece. For appearance it may be desirable to print other features, for example the mouth and/or eyes of the head on the workpiece. In such cases, it is important that the printed features are correctly placed on the workpiece such that the overall appearance of the head resembles a real head of a human being. In any case, and independent of the type of workpiece and what the print is intended to resemble, when printing on a workpiece, it may be desirable to control the position of print very exactly on the workpiece.

If the printed workpieces are to be manufactured in large batches, the printing process is preferably automated to make it commercially viable. Often, printing on workpieces made in plastic, pad printing is used for printing features on the workpieces, but other printing process may apply also. One process of providing prints on workpieces is to place the workpieces in a holder, typically arranged on a conveyer, and pass the holder with one or more workpieces attached thereto by a printing station, for example a printing station capable of pad printing. When a holder reaches the printing station, the print station comprising a printing head, prints the desired print onto the one or more workpieces held by the holder. When workpieces have been printed, the holder may be emptied for workpieces or passed to other workstations for example for providing additional prints on the workpiece(s). It requires precision in placing the workpiece (s) in the holders, and constant monitoring and adjustments of the machinery to secure that the one or more prints on each workpiece is/are correctly and precisely positioned. Even with precisely adjusted machinery, experience has shown that over time the prints have a tendency to "slide" or "glide", gradually being dislocated relative to the desired position on the workpiece. Further, it is a problem that the location in the holder of one or more workpieces is dependent on a very precise positioning relative to the workpiece. If a workpiece has been incorrectly inserted in a holder, the print is likely to be dislocated too.

This problem has been attempted alleviated by making the printing process self-adjustable, such that at least the printing head of the printing station can be adjusted by a control system. It has been known to provide such a printing system with a camera upstream of the printing station, the camera being connected to the control system to provide images of the workpiece(s) in the holder before it arrives at the printing station. By use of an image processing system the actual position of the workpiece in the holder instead of a desired or expected position may be determined, and the printing head may be controlled to move to a printing position which still provides a correctly positioned print on the workpiece. One example of such a system is disclosed in U.S. Pat. No. 4,745,857A. However, experience has shown that the problem of gliding over time is still possible with the improved system. This results in system shutdowns to recalibrate, which shutdowns are costly and undesirable in the workflow.

Therefore, there is a need for an improved printing system and an improved method for printing on workpieces.

SUMMARY OF THE DISCLOSURE

In a first aspect of the disclosure this object is achieved by a method of printing on workpieces, comprising:
  placing a workpiece in one of a plurality of holders provided spaced apart on a conveyer;
  moving the holders forward;
  obtaining a first image of the workpiece in the holder as the holder is moved towards a first printing station, the first printing station comprising a printing head adjustable relative to the conveyer;
  determining, based on the first image, the actual position of the workpiece in the holder;
  calculating a printing position of the printing head relative to the holder for positioning the print in a predetermined desired position on the workpiece, based on the predetermined desired position of the print on the workpiece and the determined actual position of the workpiece in the holder;
  adjusting the position of the printing head to the calculated printing position; and
  printing a print on the workpiece;
wherein the method further comprises
  obtaining a second image of the printed workpiece in the holder after the conveyer has moved the holder downstream of the first printing station, determining, in said second image, the actual position of the print on the workpiece;
  calculating any deviance of the actual position of the print on the workpiece relative to the predetermined desired position of the print on the workpiece; and
  if a deviance is detected, compensating for the deviance in the calculation of the printing position of the head for a workpiece in the next holder upstream of the printing station.

The method of printing on workpieces may be referred to as an automated method of printing on workpieces. The method of printing on workpieces may further be performed by an electronic control system.

The conveyer may be an endless conveyer.

In an embodiment, before printing on a workpiece, a print for the workpiece is collected by the printing head from a print source arranged adjacent to the printing station.

In further embodiment the method may utilize pad printing.

In a further embodiment of any of the above embodiments, the first print station may comprise a robot arm, said printing head being provided at a distal end of the robot arm.

The method according to the first aspect of the disclosure is preferably implemented in a workpiece printing system having an electronic control system connected to various devices of the workpiece printing system, and configured for controlling at least a printing head of the printing station of the workpiece printing system.

For example, the method according to any one of the embodiments described above may be implemented in a workpiece printing system according to any of embodiments of a second aspect of the disclosure described in further detail in the following.

In the second aspect of the disclosure, the object is obtained by a workpiece printing system comprising:
- a conveyer comprising a plurality of holders, each holder being configured for holding a workpiece, and the holders being spaced apart along the conveyer to be moved thereby;
- a loading device for placing a workpiece in a holder when the holder is adjacent to the loading device;
- a first printing station arranged along at a position the conveyer to place a print on a workpiece in a holder, when the holder is adjacent to the first printing station, the first printing station comprising a printing head adjustable relative to the conveyer;
- an ejection device arranged along the conveyer downstream of the first printing station, and for removing a workpiece from a holder, when the holder is adjacent to the ejection device;
- a control system comprising a controller electronically connected to the conveyer and the first printing station; and
- a first camera arranged to view a portion of the conveyer upstream of the first printing station, the first camera being connected to the controller for proving a first image of a holder with a workpiece to the control system, when the holder approaches the first printing station, wherein the control system, based on the first image from said first camera is configured to
- determining, from said first image, the actual position of the workpiece relative to the holder;
- calculating a printing position of the head relative to the holder, based on a predetermined desired position of the print on the workpiece and the determined actual position of the workpiece in the holder; and
- aligning the printing head of the first print station with a holder at the desired printing position when the holder is adjacent to the first printing station to provide a print in a desired location on the workpiece in the holder, wherein the workpiece printing system further comprises a second camera arranged to view a portion of the conveyer downstream of the first printing station, the second camera being connected to the controller to provide images thereto; and wherein the control system is further configured to:
- determining, from a second image obtained by said second camera, the actual position of a print on a workpiece;
- comparing the actual position of the print on the workpiece with the predetermined a desired position to calculate a deviance from the desired position; and
- if a deviance is calculated, adjusting the calculation of the printing position of the head for a workpiece in the next holder upstream of the first printing station.

The workpiece printing system may be referred to as an automated workpiece printing system. The control system of the workpiece printing system may further be an electronic control system.

The conveyer may be an endless conveyer.

In an embodiment, the control system is further configured for, before printing on a workpiece, controlling the printing head to collect a print for the workpiece from a print source arranged adjacent to the first printing station.

In an embodiment, the workpiece printing system is configured for pad printing.

In a further embodiment, the first printing station comprises a robot arm, said printing head being provided at a distal end of said robot arm.

In a further embodiment, each holder is configured to hold 2-30 workpieces. In a further embodiment, each holder is configured to hold 2-30 identical workpieces In a further embodiment, the control system is configured for controlling the movement of the conveyer based on information of the position of the holders on the conveyer relative to the first printing station.

In a further embodiment, the control system is configured for controlling one or more of the following
- placing one or more workpieces in holders at the loading device; and
- removing workpieces from holders at the ejection device.

In a further embodiment, the control system is configured to control the ejection device, and where the ejection device is configured such that the ejected workpieces may be sorted in at least two fractions, and wherein the control system is configured to remove workpieces that has a deviance in the print relative to the desire position of the print, and place such workpiece in a particular fraction.

Thereby, the incorrectly printed workpieces may be sorted out, and the correctly printed workpieces may be used in further process steps.

It should be emphasized that the term "comprises/comprising/comprised of" when used in this specification is taken to specify the presence of stated features, integers, steps or components but does not preclude the presence or addition of one or more other features, integers, steps, components or groups thereof.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

FIG. 1 in diagram form shows a workpiece printing system according to one aspect of the disclosure.

DETAILED DESCRIPTION OF THE EMBODIMENTS

FIG. 1 shows a workpiece printing system 1 according to one aspect of the disclosure. The workpiece printing system 1 comprises a conveyer 10 having a plurality of holders 20. In the embodiment shown, the conveyer 10 is an endless conveyer. In principle, the conveyer may be another type. The holders 20 are spaced apart along the conveyer 10. Preferably, the holders 20 are equidistantly attached to the conveyer 10. However, in other embodiments the distance between neighbouring holders 20 may vary.

Each holder 20 is configured for holding a workpiece 30, such as one workpiece 30. However, in some embodiments, the holder may hold a number of workpieces 30.

The holders 20 are configured for holding the one or more workpieces 30 stably during a printing process at a first printing station 50, and possibly during other procedures being performed at other workstations (not shown). The holders 20 may be detachably attached to the conveyor 10.

The workpieces 30 may, for example, be injection moulded workpieces, formed in plastic. For example, the workpiece 30 may be the head of a toy figurine, which is to be assembled to other workpieces to form the toy figurine. Such a workpiece 30 may be made, e.g. in an injection moulding process, with certain features of a head, ears and/or nose for example, formed as integrated parts of the workpiece 30. For appearance, it may be desirable to print other feature, for example the mouth and/or eyes of the head on the workpiece 30. In such cases, it is important that the printed features are correctly placed on the workpiece 30 such that the overall appearance of the head resembles a real head. It will be appreciated that other shapes of workpieces 30 are conceivable. In the diagrammatic FIG. 1, the workpieces 30 are represented by a simple rectangle for simplicity.

The workpieces 30 may come from a production line or they may come from storage. In either case, they may be placed in a holder 20 by a loading device 40, which in FIG. 1 is schematically represented as a robot arm. However, it will be appreciated that other types of loading devices may be used.

When one or more workpieces 30 have been placed in a holder 20 at the loading device 40, which is arranged adjacent to the conveyor 10, the holder 20 is moved forward to a downstream workstation for processing of the one or more workpieces 30 thereon, by movement of the conveyor 10. In FIG. 1, the mentioned first printing station 50 is shown as such a workstation immediately downstream of the loading device 40. It will be appreciated that there may be other workstations between the loading device 40 and the first printing station 50.

In FIG. 1, the arrow 90 indicates the direction of movement of the conveyor 10, and therefore the holders 20 provided thereon.

When the one or more workpieces 30 in a holder 20 has been printed at the first printing station 50, the conveyor 10 moves the holder 20 with the printed workpiece(s) forward and a new holder 20 with workpiece(s) 30 arrive at the first printing station 50, while the first is being carried on. In FIG. 1 the holders reach an ejection device 60. It will be appreciated that the system may comprise further workstations in between, the first printing station 50 and the ejection device 60, e.g. one or more further printing stations (not shown).

The ejection device 60 is configured for removing workpieces from the holders 20 as they arrive at the ejection device 60. The ejection device 60 is arranged adjacent to the conveyor 10 so that it can perform actions to the holders 20 on the conveyor 10. The ejection device 60 may be a robot arm (not shown). However, other ejection devices 60 are conceivable.

The first printing station 50 is also arranged adjacent to the conveyor 10 so that it can perform actions to the holders 20 on the conveyor 10. For this purpose, the first printing station 50 comprises a moveable printing head 55. The printing head 55 is moveable relative to conveyor 10. In preferred embodiments, the first printing station 50 may comprise a robot having a robot arm 52, the printing head 55 being attached to a distal med of the robot arm 52.

In any case, the first printing station 50 may be configured such that the printing head 55 may collect a print form from a print form source (not distinctly shown) arranged adjacent to the printing station 50. The print form in the print form source may be transferred to the printing head 55 and collected from the print form source and may be transferred to the workpieces 30 afterwards.

One or more of the workstations, such as the first printing station 50, the loading device 40, the ejection device 60, the conveyor 10 itself, may be controlled by a control system 100. The control system 100 comprises a controller 101. The control system 100 may be referred to as an electronic controls system. The controller 101 may be referred to as an electronic controller.

The controller 101 may be connected to communicate with the elements of the workpiece printing system 1, in order to receive information from these element and/or forward instruction signals thereto. Such communication may be wired connections, or they may be wirelessly connected.

Thus, the controller 101 may be connected to the conveyer 10 via a connection 110. The controller 101 may be connected to the loading device 40 via a connection 140. The controller 101 may be connected to the first printing station 50 via a connection 150. The controller 101 may be connected to the ejection device 60 via a connection 160.

Further, and as explained below, the workpiece printing system 1 may further comprise a first camera 70 and a second camera 80. The controller 101 may be connected to the first camera 70 via a connection 170. Further, the controller 101 may be connected to the second camera 80 via a connection 180.

Further, the controller 101 may be configured for controlling the conveyor 10 through a suitable connection (not distinctly shown).

As mentioned above, the first printing station 50 is arranged at a position along the conveyor 10 and adjacent thereto in order to place a print on a workpiece 30 in a holder 20, when the holder 20 is adjacent to the first printing station 50. As also mentioned, the first printing station 50 comprises a printing head 55 which is adjustable relative to the conveyor 10

The ejection device 60 is arranged at another position along the conveyor 10, and adjacent thereto, and downstream of the first printing station 50. The ejection device 60 is configured for removing a workpiece 30 from a holder 20, when the holder 20 is adjacent to the ejection device 60.

As it may be desirable to control the position of print exactly on the workpiece 30, the aforementioned first camera 70 is included in the workpiece printing system 1.

The first camera 70 is arranged to view a portion of the conveyor upstream of the first printing station 50.

As also mentioned above, the first camera 70 is connected to the controller 101 and is configured to transmit images to the controller 101 via the connection 170 between the controller 101 and the first camera 70. Thus, a first image of a workpiece 30 in a holder 20 or a holder 20 with a workpiece 30 may obtained from the first camera 70 and be provided to the control system 100, when the holder 20 approaches the first printing station 50. The first image may be obtained during movement of the conveyor 10 or the conveyor 10 may be arrested shortly to obtain the first image.

The control system 100 may—for example by an image processing program running on the controller 101—based on the first image from the first camera 70 be configured to:

determine the actual position of the workpiece 30 relative to the holder 20;

calculate a printing position of the head 55 relative to the holder 20, based on a predetermined desired position of the print on the workpiece 30 and the determined actual position of the workpiece in the holder 20; and align the moveable head 55 of the first printing station 50 with a holder 20 at the desired printing position when the holder 20 is adjacent to the first printing station 50 to provide a print in a desired location on the workpiece 30 in the holder 20.

The alignment of the moveable head 55 of the first printing station 50 with a holder 20 at the desired printing position is performed by sending a suitable control signal from the controller 101 to the first printing station 50 via the connection 150 between the controller 101 and the first printing station 50.

As mentioned, the workpiece treatment system 1 may further comprise a second camera 80. The second camera 80 is arranged to view a portion of the conveyer 10 downstream of the first printing station 50.

The second camera 80 is also connected to the controller 101 and is intended for feeding images into the controller 101 via the connection 180 between the controller 101 and the second camera 80. Thus, a second image of a holder 20 with a workpiece 30 provided with a print may obtained from the second camera 80, and be provided to the control system 100, when the holder 20 is moved away from the first printing station 50 by the conveyer 10. The second image may be obtained during movement of the conveyer 10, or the conveyer 10 may be arrested shortly to obtain the second image.

The control system 100 may, for example by an image processing program running on the controller 101, and based on the second image from the second camera 80 be configured to determining, the actual position of a print on a workpiece 30;

comparing the actual position of the print on the workpiece 30 with the predetermined, desired position to calculate a deviance from the desired position; and if a deviance is calculated, adjusting the calculation of the printing position of the printing head 55 for a workpiece 30 in the next holder 20 upstream of the printing station 50.

It is to be noted that the figures and the above description have shown the example embodiments in a simple and schematic manner. Many of the specific mechanical details have not been shown since the person skilled in the art should be familiar with these details and they would just unnecessarily complicate this description. For example, the specific materials used, and the specific injection moulding procedure have not been described in detail since it is maintained that the person skilled in the art would be able to find suitable materials and suitable processes to manufacture the container according to the current disclosure.

LIST OF PARTS 1 workpiece printing system
10 conveyer/endless conveyer
20 holder on conveyer/endless conveyer
30 workpiece
40 loading device
50 first printing station
55 printing head
60 ejection device
70 first camera
80 second camera
100 control system
101 controller
110 connection between controller and conveyer
140 connection between controller and loading device
150 connection between controller and first printing station
160 connection between controller and ejection device
170 connection between controller and first camera
180 connection between controller and second camera.

The invention claimed is:

1. A method of printing on workpieces, comprising:
placing a workpiece in one of a plurality of holders provided spaced apart on a conveyer;
moving the holders forward;
obtaining a first image of the workpiece in the holder as the holder is moved towards a first printing station, the first printing station comprising a printing head adjustable relative to the conveyer;
determining, based on the first image, the actual position of the workpiece in the holder;
calculating a printing position of the printing head relative to the holder for positioning the print in a predetermined desired position on the workpiece, based on the predetermined desired position of the print on the workpiece and the determined actual position of the workpiece in the holder;
adjusting the position of the printing head to the calculated printing position; and
printing a print on the workpiece;
wherein the method further comprises
obtaining a second image of the printed workpiece in the holder after the conveyer has moved the holder downstream of the first printing station,
determining, in said second image, the actual position of the print on the workpiece;
calculating any deviance of the actual position of the print on the workpiece relative to the predetermined desired position of the print on the workpiece;
if a deviance is detected, compensating for the deviance in the calculation of the printing position of the printing head for a workpiece in the next holder upstream of the printing station.

2. The method according to claim 1, wherein, before printing on a workpiece, a print for the workpiece is collected by the printing head from a print source arranged adjacent to the printing station.

3. The method according to claim 1 utilizing pad printing.

4. The method according to claim 1, wherein the first printing station comprises a robot arm, said printing head being provided at a distal end of said robot arm.

5. A workpiece printing system comprising:
a conveyer comprising a plurality of holders, each holder being configured for holding a workpiece, and the plurality of holders being spaced apart along the conveyer to be moved thereby;
a loading device for placing a workpiece in a holder when the holder is adjacent to the loading device;
a first printing station arranged along the conveyer to place a print on a workpiece in a holder, when the holder is adjacent to the first printing station, the first printing station comprising a printing head adjustable relative to the conveyer;
an ejection device arranged along the conveyer downstream of the first printing station, and for removing a workpiece from a holder when the holder is adjacent to the ejection device;

a control system comprising a controller electronically connected to the conveyer and the first printing station; and a first camera arranged to view a portion of the conveyer upstream of the first printing station, the first camera being connected to the controller for providing a first image of a holder with a workpiece to the control system, when the holder approaches the first printing station, wherein the control system, based on the first image from said first camera is configured for:

determining, from said first image, the actual position of the workpiece relative to the holder;

calculating a printing position of the printing head relative to the holder, based on a predetermined desired position of the print on the workpiece and the determined actual position of the workpiece in the holder; and aligning the moveable printing head of the first printing station with a holder at the desired printing position when the holder is adjacent to the first printing station to provide a print in a desired location on the workpiece in the holder, wherein the workpiece treatment system further comprises a second camera arranged to view a portion of the conveyer downstream of the first printing station, the second camera being connected to the controller to provide images thereto; and wherein the control system is further configured for:

determining, from a second image obtained by said second camera, the actual position of a print on a workpiece;

comparing the actual position of the print on the workpiece with the predetermined a desired position to calculate a deviance from the desired position; and if a deviance is calculated, adjusting the calculation of the printing position of the printing head for a workpiece in the next holder upstream of the printing station.

6. The workpiece printing system according to claim 5, wherein the control system is further configured for, before printing on a workpiece, controlling the printing head to collect a print for the workpiece from a print source arranged adjacent to the printing station.

7. The workpiece printing system according to claim 5 utilizing pad printing.

8. The workpiece printing system according to claim 5, wherein the first printing station comprises a robot arm, said printing head being provided at a distal end of said robot arm.

9. The workpiece printing system according to claim 5, wherein each holder is configured to hold 2-30 identical workpieces.

10. The workpiece printing system according to claim 5, wherein the control system is further configured for controlling the movement of the conveyer based on information of the position of the holders on the conveyer relative to the first printing station.

11. The workpiece printing system according to claim 5, wherein the control system is further configured for controlling one or more of the following:

placing one or more workpieces in holders at the loading device;

removing workpieces from holders at the ejection device.

12. The workpiece printing system according to claim 5, wherein the control system is further configured to control the ejection device, and where the ejection device is configured such that the ejected workpieces may be sorted in at least two fractions, and wherein the control system is configured to remove workpieces that has a deviance in the print relative to the desire position of the print, and place such workpiece in a particular fraction.

13. A workpiece printing system comprising:

a conveyer comprising a plurality of holders configured for holding a workpiece, the holders spaced apart along the conveyer to be moved thereby;

a first printing station arranged along the conveyer to place a print on a workpiece in a holder, the first printing station having an adjustable printing head;

an ejection device arranged along the conveyer, downstream of the first printing station, the ejection device configured for removing a workpiece from a holder; and a control system comprising:

a controller electronically connected to the conveyer and the first printing station;

a first camera arranged to view a portion of the conveyer upstream of the first printing station, the first camera being connected to the controller for providing a first image of a holder with a workpiece to the control system; and a second camera arranged to view a portion of the conveyer downstream of the first printing station;

wherein the control system is configured to:

determine, based on the first image from the first camera, an actual position of the workpiece relative to the holder;

calculate a printing position of the printing head relative to the holder, based on a predetermined desired position of the print on the workpiece and the determined actual position of the workpiece in the holder;

align the printing head of the first print station with a holder at the desired printing position to provide a print in a desired location on the workpiece in the holder;

determine, based on a second image from the first camera, an actual position of the print on the workpiece;

compare the actual position of the print on the workpiece with the desired position to calculate a deviance from the desired position; and if a deviance is calculated, adjusting the calculation of the printing position of the printing head for a subsequent workpiece.

* * * * *